US007869368B2

(12) United States Patent
Stephan

(10) Patent No.: US 7,869,368 B2
(45) Date of Patent: Jan. 11, 2011

(54) PERFORMANCE MEASURING IN A PACKET TRANSMISSION NETWORK

(75) Inventor: Emile Stephan, Pleumeur Bodou (FR)

(73) Assignee: France Telecom, Paris (FR)

( * ) Notice: Subject to any disclaimer, the term of this patent is extended or adjusted under 35 U.S.C. 154(b) by 698 days.

(21) Appl. No.: 11/579,814

(22) PCT Filed: May 3, 2005

(86) PCT No.: PCT/FR2005/001114

§ 371 (c)(1),
(2), (4) Date: Nov. 7, 2006

(87) PCT Pub. No.: WO2005/112345

PCT Pub. Date: Nov. 24, 2005

(65) Prior Publication Data

US 2008/0137538 A1    Jun. 12, 2008

(30) Foreign Application Priority Data

May 7, 2004    (FR) .................................. 04 04985

(51) Int. Cl.
*H04L 12/26*    (2006.01)
(52) U.S. Cl. ..................... 370/241; 370/252
(58) Field of Classification Search .............. None
See application file for complete search history.

(56) References Cited

U.S. PATENT DOCUMENTS

| 5,477,531 A | 12/1995 | McKee et al. |
| 6,269,330 B1 * | 7/2001 | Cidon et al. .................. 714/43 |
| 6,725,378 B1 | 4/2004 | Schuba et al. |
| 2004/0136327 A1 * | 7/2004 | Sitaraman et al. ........... 370/252 |
| 2005/0013245 A1 * | 1/2005 | Sreemanthula et al. ...... 370/229 |
| 2005/0249125 A1 * | 11/2005 | Yoon et al. .................. 370/252 |
| 2007/0286086 A1 * | 12/2007 | Taylor et al. ................. 370/241 |
| 2008/0019283 A1 * | 1/2008 | Emile ......................... 370/252 |
| 2008/0259809 A1 * | 10/2008 | Stephan et al. .............. 370/252 |

FOREIGN PATENT DOCUMENTS

WO    WO 02/15482 A2    2/2002

* cited by examiner

*Primary Examiner*—Min Jung
(74) *Attorney, Agent, or Firm*—McKenna Long & Aldridge LLP

(57) ABSTRACT

In a data packet transmission network a stream of packets of data sent by a first terminal passes in transit through at least one network equipment with which there is associated a stream measurement unit; wherein said first terminal and said measurement unit are connected to a collection unit. The measurement method comprises the following steps the first terminal generates a stream of packets, comprising a first and a second session status control packets the measurement unit analyzes said first and/or second packet of said stream, in transit through the network equipment the first terminal sends the collection unit a sent packet stream description comprising at least the number of packets sent the stream measurement unit sends the collection unit a stream description comprising at least one information item indicating the number of analyzed packets; and the collection unit identifies each analyzed packet of the stream as a function of the stream description to correlate said stream description and said sent packet stream description packet by packet.

10 Claims, 3 Drawing Sheets

PERFORMANCE MEASURING IN A PACKET TRANSMISSION NETWORK

This application claims the benefit of French patent application No. 0404985, filed on May 7, 2004 and PCT International application No. PCT/FR2005/001114, filed on May 3, 2005, which are hereby incorporated by reference for all purposes as if fully set forth herein.

FIELD OF THE INVENTION

The present invention relates to the field of telecommunication networks and more precisely to the field of the metrology of packet transmission telecommunication networks.

BACKGROUND OF THE INVENTION

Metrology, in the literal sense of "science of measurement", is expanding in different network fields such as traffic characterization and modeling, traffic analysis and quality of service and performance optimization. Network metrology is also used to improve network supervision. One objective is notably to provide assistance with the dimensioning of a network and with diagnosing problems detected in a network.

The increasing complexity of networks, and in particular of the Internet, leads to a lack of knowledge of traffic and conditions of use. It is becoming more and more difficult to have real control of the network and its behavior.

The traffic of a network is generally made up of a plurality of streams of packets. A stream of packets is defined as an exchange of data between two terminals of a network the packets whereof have common characteristics, in particular common source, destination and service characteristics.

Metrology generally has the objective of determining measurements to be performed on the traffic of the network under study in order to obtain a better knowledge of that traffic.

Two main types of measurements are known. A first type is made up of measurements performed on a stream of test packets. To perform these so-called "active" measurements, a stream of test packets is sent across the network being studied from a sender first terminal to a receiver second terminal. A test packet generally has a specific format containing a first field indicating a time reference of sending the packet and a second field indicating the sequence number of the packet in the stream of test sent packets. Consequently, the receiver terminal determines a transmission time of a test packet from the sender terminal as a function of the first field of the packet. The receiver terminal can also detect losses of packets as a function of the second field of a test packet. More generally, a test packet is a packet whereof a sending time reference is known and that can be distinguished from other packets on reception in order to associate it with an arrival time reference or to determine that it has been lost.

It is thus possible to obtain performance characteristics of an "end-to-end" stream, i.e. of the complete path of the stream of test packets, from the sender to the receiver, and in particular measurements of the transmission time between the two terminals, on the basis of the known sending and receiving time references of the packets.

This first type of measurement therefore produces performance measurements on a complete path of the stream of test packets, i.e. between the sender terminal of the stream and the receiver terminal of the stream. The measurements obtained in this way relate to the test packets of a stream. Because of this they are qualitatively accurate.

One drawback of this type of measurement is that it provides information relating only to the extremities of the stream of test packets. Thus it is impossible to obtain information on a segment of the complete path between two network equipments or between a network equipment and one of the terminals. Information obtained in this way is therefore geographically inaccurate.

There is known a second type of measurement performed in a network equipment by an analysis of the streams passing in transit through it. These so-called "passive" measurements can be performed either by onboard measurement units in the network equipments or by measurement units (or passive probes) external to the network equipments and dedicated to passive measurements. The latter generally have less information available than onboard measurement units. These measurement units monitor the traffic circulating on the links between the network equipments. This type of passive measurement, widely used in existing networks, produces volumetric information for each stream and for each network equipment.

One drawback of this type of measurement is that it supplies information relating to a network equipment that is very difficult to correlate with other information relating to another network equipment. Consequently, even though it is possible to obtain relatively accurate geometrical information on a given segment by correlation, such correlation remains complex to implement, in particular if the streams are sampled in order to analyze them.

Another drawback of this type of measurement is that it provides only volumetric information relating to the stream for each network equipment, in particular the number of analyzed packets and the sum of the sizes of the analyzed packets for a given stream. Consequently, the information obtained by this type of measurement may prove to be qualitatively insufficient and even somewhat unreliable, in particular if the streams are sampled in order to analyze them.

It is thus beneficial to obtain qualitatively accurate information, i.e. information relating to the packets of a stream, and geographically accurate information, i.e. information relating to segments of the complete path of the stream in the existing networks.

Note that the expression "network equipment" refers to an active network equipment, i.e. one that fulfills an active processing function in the network, such as switches or routers, for example. An active processing function in the network may also be defined as the opposite of a passive processing function fulfilled in particular by a measurement unit.

SUMMARY OF THE INVENTION

The present invention aims to propose a solution tending to satisfy these requirements.

A first aspect of the invention proposes a measurement method for use in a data packet transmission network, wherein a stream of packets of data sent by a first terminal passes in transit through at least one network equipment with which there is associated a stream measurement unit; wherein said first terminal and said measurement unit are connected to a collection unit; said method comprising the following steps:

the first terminal generates a stream of packets, comprising a first and a second session status control packets;

the measurement unit analyzes said first and/or second packet of said stream, in transit through the network equipment;

the first terminal sends a sent packet stream description comprising at least the number of sent packets to the collection unit;

the stream measurement unit sends a stream description comprising at least one information item indicating the number of analyzed packets to the collection unit; and the collection unit identifies each analyzed packet of the stream as a function of the stream description to correlate, packet by packet, said stream description and said sent packet stream description.

A second aspect of the invention proposes a measurement system comprising means adapted to implement the above method.

A third aspect of the invention proposes a collection unit comprising means adapted to implement the above method.

Thanks to the above arrangements, it is possible to obtain geographically and qualitatively accurate information on traffic in the transmission network under study.

Other aspects, objects and advantages of the invention will become apparent on reading the description of one of its embodiments.

BRIEF DESCRIPTION OF THE DRAWINGS

The invention will also be better understood with the aid of the drawings, in which.

DESCRIPTION OF PREFERRED EMBODIMENTS

The invention may be used in all fields of metrology applied to packet transmission networks.

The invention proposes to couple active measurements and passive measurements in order to obtain the benefits of each of them. Accordingly, in one embodiment of the invention, two terminals (or active probes) exchange a test packet that is analyzed at several points of the network, in particular on the basis of time references for the passage of the packet.

The context of the invention is that of any type of network for transmission of packets of fixed size and packets of variable size. To illustrate the following description, an IP (Internet Protocol) network is taken by way of example, without limiting the scope of the invention. The invention may in particular be implemented under version 4 or version 6 of the Internet Protocol.

The invention applies to analysis methods comprising selecting packets from the streams analyzed, for example sampling the streams, or to analysis methods with no selection of packets from the streams analyzed.

Note that, in one embodiment of the invention, a measurement unit generates stream descriptions comprising information relating to the stream whereas a terminal generates packet stream descriptions comprising information relating to the packets of the stream.

Figure 1:
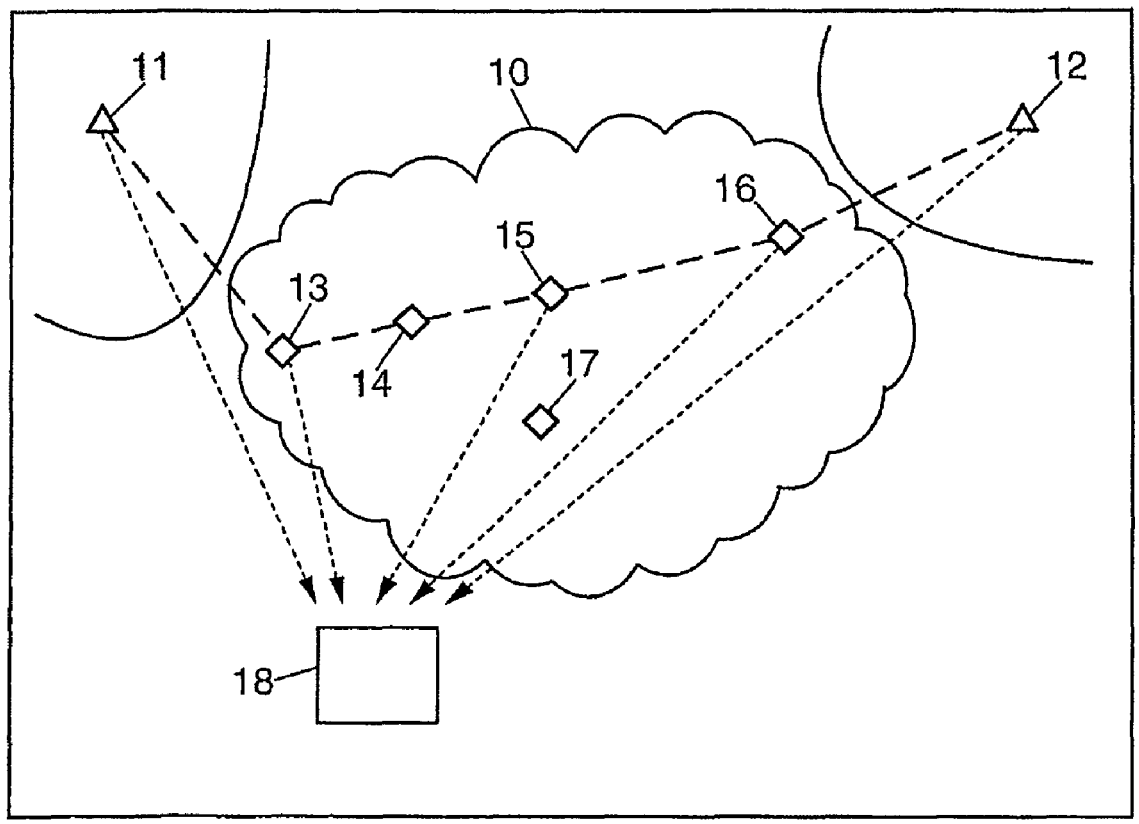
FIG. 1 is a diagram of an architecture of the network as claimed in one embodiment of the invention.

FIG. 1 represents a network architecture comprising a measurement system as claimed in one embodiment of the invention. A terminal 11 and a terminal 12 are connected to the IP network 10.

The terminals 11 and 12 are adapted to generate streams of test packets. The IP network 10 comprises equipments 13, 14, 15, 16 and 17. Of these equipments, the equipments 13, 15 and 16 are each provided with an onboard stream measurement unit. The measurement units have a measurement export function. The invention also covers a configuration in which the stream measurement unit is an external entity monitoring traffic in transit on a transmission link between network equipments or between a terminal and an equipment. The terminals 11 and 12 and the equipments comprising stream measurement units 13, 15 and 16 are connected to a collection unit 18. This collection unit is adapted to receive information exported by the measurement units and the terminals 11 and 12 in order to group the information and correlate it to provide accurate information relating to the test packets of the stream and corresponding to particular segments of the complete path of the stream, in particular performance information relating to loss of packets or to the packet transmission time.

The terminals 11 and 12 may be fixed terminals. They may equally well be mobile terminals.

In a preferred embodiment of the invention, the onboard stream measurement units in the equipments 13, 15, 16 implement stream analysis functions of the kind, currently being standardized, known as 'IPFIX', one implementation of which is distributed by Cisco Systems, Inc. under the name "Netflow". An "IPFIX" type service is a global analysis service of streams passing in transit through packet transmission network equipments, in particular routers and switches of IP, ATM, Ethernet or MPLS (Multiple Protocol Label Switch) type. This kind of service supplies an analysis of the streams entering an equipment. It is also adapted to accumulate statistical measurements relating to a given stream and to export those measurements asynchronously to a collection unit 18. The measurements are preferably exported to the collection unit by encoding the data in order to reduce the necessary bandwidth. The measurements may be exported on the fly, on expiry of a timer or on detection of a stream end. A measurement unit may also store these measurements to enable the collection unit 18 to download them.

The invention covers any other analysis function of a measurement unit supplying stream information and any other method of exporting that stream information.

In the remainder of this description, for reasons of clarity and by way of example, the network equipments provided with a stream measurement unit are routers. The invention also covers a stream measurement system in which the network equipments provided with a stream measurement unit are other network equipments, such as switches, for example.

A stream of test packets sent by the terminal 11 to the terminal 12 is generally identified by the following information:

the IP address, denoted T11_SrcAddr, and the logical port, denoted T11_SrcPort, of the sender terminal 11;

the IP address, denoted T12_DstAddr, and the logical port, denoted T12_DstPort, of the receiver terminal 12;

the protocol used, denoted Proto_test, for example TCP (standing for "Transmission Control Protocol"), UDP (standing for "User Datagram Protocol"), or ICMP (standing for "Internet Control Message Protocol").

A network equipment provided with a stream measurement unit is in a position to supply stream descriptions that preferably comprise:

a field for the input and output interface number, respectively denoted 'Input' and 'Output';

a field for the number of analyzed packets and accumulated for a stream, denoted 'Packets';

a field for the number of octets of the IP layer corresponding to the analyzed packets of the stream, denoted 'Octets';

a field for a time reference for the passage of the first analyzed packet in the stream and a field for a time reference of the passage of the last analyzed packet in that stream, respectively denoted 'First' and 'Last';

a field for the IP address of the input interface of the next router, denoted 'NextHop'.

If the equipment is a router, a stream description preferably further comprises a field for the numbers of the administrative domains, or AS (standing for "Autonomous System"), that have been crossed, respectively denoted 'SrcAS' and 'DstAS'.

A measurement unit of a router stores data relating to the streams that cross that router. On reception of a packet, the measurement unit determines if the packet belongs to a stream being analyzed. If it belongs to a stream being analyzed, the fields corresponding to the number of analyzed packets for that stream, to the sum of the sizes of the analyzed packets, and to the time reference of the passage of the last packet analyzed, respectively the fields 'Packets', 'Octets' and 'Last', are updated. If the packet received does not belong to a stream being analyzed, the measurement unit of the router initiates an analysis of that stream, storing, among other things, in the 'First' field, a time reference for the passage of the first packet of the stream. The measurement unit of the router terminates the analysis of a stream on detection of the end of the stream.

A measurement unit is generally adapted to export the stored data either when the end of the stream is detected or before the end of the stream being analyzed if a certain time has elapsed since the initiation of the analysis of the stream.

The stored data relating to the analysis of a stream is then encoded in order to export it to the collection unit 18 in the form of stream description tickets. A plurality of stream description tickets relating to a plurality of streams being studied may be grouped into a stream description block, as described hereinafter.

In addition to the technical data that the collection unit 18 needs to decode a description ticket, in particular a field denoted 'Version' identifying a software version of the IPFIX type service, the header of a stream description ticket also preferably indicates a time reference of the router. Fields denoted 'SysUptime' and 'UnixSecs' enable deduction of the time at which the stream description ticket was created. A field denoted 'FlowSequence' enables detection of loss of stream description tickets. Table 1 below shows the format of the exported stream description tickets in one embodiment of the invention.

TABLE 1

| Octets | Field name | Description |
|---|---|---|
| 0-1 | Version | IPFIX version number |
| 2-3 | Count | Number of streams exported in this packet (1-30) |
| 4-7 | SysUptime | Number of milliseconds elapsed since starting the machine |
| 8-11 | UnixSecs | Number of seconds elapsed since Jan. 1, 1970: Unix timestamp |
| 12-15 | UnixNSecs | Number of residual nanoseconds since Jan. 1, 1970 |
| 16-19 | FlowSequence | Count of total number of streams exported |
| 20-23 | Reserved | Reserved octets |

In this table the field 'Reserved' may be used to describe information such as the sender (engine_'type' and id') and a sampling method (sampling_interval).

Each stream is preferably described in a stream description ticket as detailed in table 2 below, comprising in particular information relating to the administrative domains, or AS (standing for "Autonomous System") and relating to the Type of Service, or ToS, equivalent to a Quality of Service, or QoS.

TABLE 2

| Field | Octets | Description |
|---|---|---|
| SrcAddr | 0-3 | Source IP address |
| DstAddr | 4-7 | Destination IP address |
| NextHop | 8-11 | IP address of next router |
| Input | 12-13 | SNMP index of the input interface |
| Output | 14-15 | SNMP index of the output interface |
| Packets | 16-19 | Number of analyzed packets in the stream |
| Octets | 20-23 | Total number of octets in the analyzed packets of the stream |
| First | 24-27 | Time reference of the stream start Stream |
| Last | 28-31 | Time reference of end of stream |
| SrcPort | 32-33 | TCP/UDP source port or equivalent |
| DstPort | 34-35 | TCP/UDP destination port or equivalent |
| Pad1 | 36 | Not used (zero) |
| TcpFlags | 37 | TCP flags or cumulative flags |
| Proto | 38 | IP type (example TCP=6; UDP=17) |
| Tos | 39 | IP service type |
| SrcAS | 40-41 | Source AS number |
| DstAS | 42-43 | Destination AS number |
| SrcMask | 44 | Source IP address mask |
| DstMask | 45 | Destination IP address mask |
| Pad2 | 46-47 | Not used (zero) |

Each stream may also be described by a stream description ticket comprising only some of the information listed above.

The stream description blocks grouping stream description tickets are generally sent by the measurement units to a collection unit in the form of a UDP datagram. A UDP datagram of 1464 octets, corresponding to an Ethernet frame of 1500 octets, can contain up to 30 stream description tickets.

An IPFIX type service, implemented in software, generally cannot analyze all the packets passing in transit through a network equipment. The measurement unit therefore reduces the number of packets to be analyzed by selecting certain packets in the stream of packets studied. The invention covers any way of selecting packets in a stream. In one embodiment of the invention, packets to be analyzed are selected by sampling the studied stream. The measurement units then export the stream information, as detailed in table 2, to the collection unit 18.

As stated above, test packets are injected into the network. In fact, the terminal 11 sends a stream of test packets to the terminal 12 across the network 10. The test packet stream therefore passes in transit through at least some of the network equipments 10. When test packets enter network equipments provided with a measurement unit, some or all of the test packets of the stream are analyzed.

In one embodiment of the invention, the measurement units have the capability to detect certain packets from the different streams of packets in transit through the network equipments to which they are associated, such as, in particular, various connection management packets. As a general rule, the measurement units have the capability to detect session status control packets, such as a session opening or session end packet, or even such as a session pause packet.

More specifically, in an IP type network, such measurement units are adapted to detect TCP connection management packets. Generally, the measurement units implementing an IPFIX type service have such a capability. Where a measurement unit detects a TCP connection management packet, it exports this information in the 'TcpFlags' field of a stream description ticket according to IPFIX, as indicated in table 2 with the presence of the 'TcpFlags' field.

The following sections describe the basic principles of TCP connections.

Figure 4:
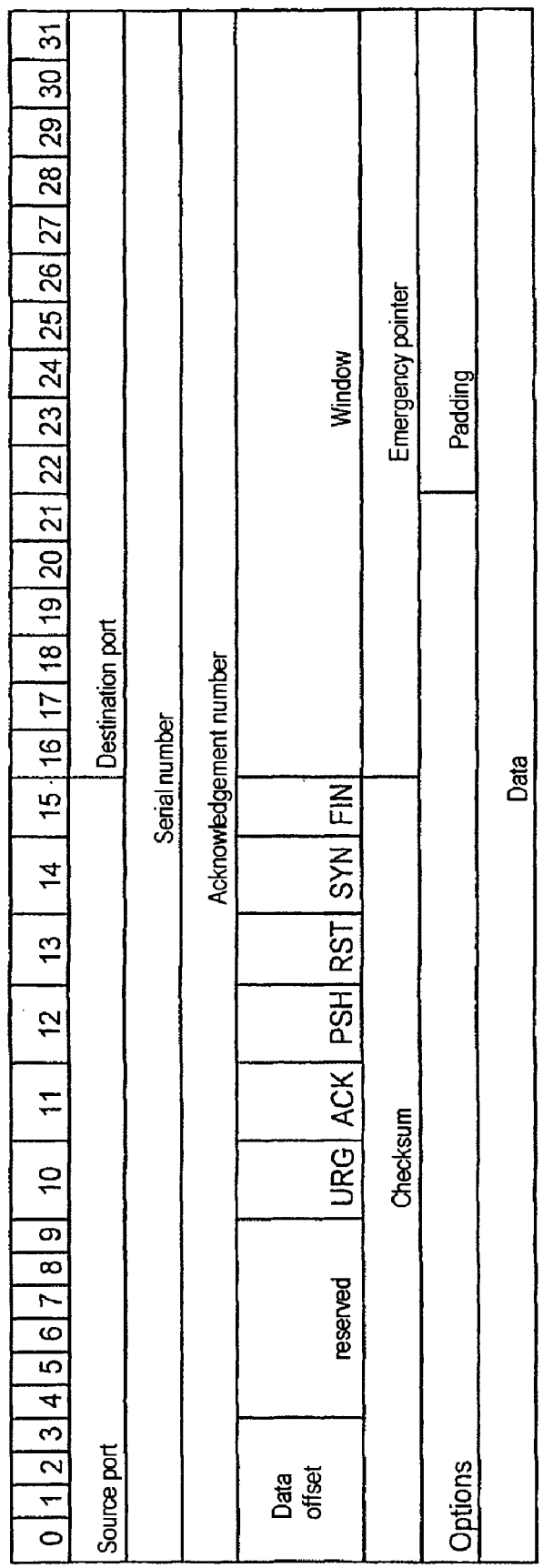
FIG. 4 illustrates a format of a TCP packet header.

One format of a packet header according to a TCP type protocol is detailed in FIG. 4.

The 'RST' flag field is equal to 1 when the connection is reset.

The 'SYN' flag field is equal to 1 when a connection is initialized.

The 'FIN' flag field is equal to 1 when the connection is interrupted.

To set up a TCP connection, the client and the server exchange data and acknowledgements. Conventionally, such a connection is set up in three steps. Firstly, the client sends a connection request message to the server. The 'SYN' field of the TCP header of such a message is equal to 1 and, because of this, such a message is hereinafter denoted SYN. Then, the server returns an acknowledgement message to the client. The 'SYN' field and the 'ACK' field of the TCP header of such a message are equal to 1 and, because of this, such a message is hereinafter denoted SYN-ACK. Finally, the client responds to this last message with an acknowledgement message. The 'ACK' field of the TCP header of such a message is equal to 1 and, because of this, such a message is hereinafter denoted ACK. On completion of this exchange of messages, the TCP connection is set up.

To close a TCP connection, the client sends a connection closure message to the server. The 'FIN' field of the TCP header of such a message is equal to 1 and, because of this, such a message is denoted FIN. The server responds to this message by sending an acknowledgement message. There is a faster TCP connection closure procedure wherein only one message is sent: the client sends a connection closure message. The 'RST' field of the TCP header of such a message is equal to 1 and, because of this, such a message is hereinafter denoted RST.

Normally, a measurement unit implementing an IPFIX type service processes a TCP stream in a particular way such that a SYN packet detected marks the start of a stream and an RST packet, or alternatively a FIN packet, detected marks the end of a stream.

One embodiment of the invention exploits this particular processing.

Advantageously, the test streams generated by the terminal 11 intended for the terminal 12 in transit through the network equipments are each made up of two test packets. In practice, the terminal 11 opens a TCP connection with the terminal 12, by sending a packet including a connection opening message. Then, on receiving the corresponding acknowledgement packet, the terminal 11 closes the connection by sending a connection closure packet. Consequently, such a test stream comprises a first SYN test packet and a second RST test packet. This characteristic of the test stream enables the collection unit 18 to perform a simple correlation between the different information exported by the terminals and the measurement units, respectively in packet stream descriptions and in stream descriptions.

As has been described above, the stream descriptions exported by the measurement units comprise fields relating to the different TCP connection management messages, denoted 'TcpFlags'. Consequently, the collection unit receiving on the one hand a test packet stream description from the sender terminal 11, then a test packet stream description from the destination terminal 12, and receiving on the other hand a test stream description from the measurement units can correlate this information to obtain in a simple manner information packet by packet such as measurements of packet losses on segments of the complete path, that is, between a terminal and a network equipment or even between two network equipments. Such measurements are called packet loss vectors. In practice, a description of such a stream can be used to detect if none, one or both of the packets of the stream have passed through and have been analyzed by a measurement unit associated with a given network equipment. If no packet of the stream has been analyzed, the 'TcpFlags' field of the stream description ticket sent by the measurement unit associated with this equipment does not contain the SYN or RST indications. On the other hand, if the packet of the connection opening message and/or the packet of the connection closure message is analyzed by a measurement unit, the 'TcpFlags' field contains the SYN and/or RST indication. In such an embodiment, a description of the test stream can be used to deduce a test packet stream description and, from this, deduce a packet loss vector on a segment of the complete path.

It will be noted that the collection unit can deduce information from the values contained in the 'TcpFlags' field. Thus, if the 'TcpFlags' field contains the RST indication, the collection unit can deduce from this that the SYN packet has not been lost.

Moreover, the stream descriptions exported by the measurement units also preferably comprise fields relating to the time references of passage of the first packet and of the last packet of a stream, respectively denoted 'First' and 'Last'. Since the test stream comprises only two test packets, the measurement unit indicates via the two 'First' and 'Last' fields of the stream description tickets, a time reference of each of the packets of a test stream, in the case where the two packets are analyzed. The collection unit is thus able to simply perform a correlation, packet by packet, between the packet stream descriptions received from the terminals and the stream descriptions received from the measurement units. Consequently, the collection unit can very easily calculate packet transmission times on segments of the complete path of the stream. Such times are called instantaneous packet transmission time vectors.

More generally, the collection unit 18 is in a position to supply the following information instantaneously:

information relating to the path of the packets of the stream in the network; for example a list of one or more equipments through which the analyzed packets pass in transit;

information relating to management of the equipments of the path of the stream in the network, for example a list of management addresses of one or more equipments through which the analyzed packets pass in transit;

information relating to processing of the stream in the equipments of the path, for example a list of levels of quality of service applied by one or more equipments to the analyzed packets or a list of administrative domains crossed by the stream;

network performance information relating to a loss of packets on a segment between one of the terminals and an equipment or between two terminals and/or a packet transmission time relating to a segment between one of the terminals and an equipment or between two equipments.

Under certain conditions it may prove very useful to reiterate successively the steps of sending of test packet streams by the terminal 11, of stream analysis in the network equipments, and of stream reception by the terminal 12. Under such conditions, the measurement unit is able to supply, by iteration and by correlation of information obtained on each iteration relating to a segment between one of the terminals and an equipment or between two equipments, statistics on measurements of performance such as those defined by the IETF (Internet Engineering Task Force) or the ITU (International Telecommunications Union), for example:
- a loss of packets;
- a packet transmission lead time; and
- a transmission lead time variation.

Reiteration of the measurement process is also very useful if the analysis is performed on selected packets of the test stream, for example by sampling the test stream.

Accordingly, after reiteration of the steps, the collection unit is in a position to supply the following information more accurately and more exhaustively, by correlation of the data obtained on each iteration:

- information relating to the path of the packets of the stream in the network, for example a list of one or more equipments through which the analyzed packets pass in transit;
- information relating to management of the equipments of the path of the stream in the network, for example a list of management addresses of one or more equipments through which the analyzed packets pass in transit;
- information relating to processing of the stream in the equipments of the path, for example a list of levels of equality of service applied by one or more equipments to the analyzed packets or a list of administrative domains crossed by the stream;
- network performance information relating to a loss of packets on a segment between one of the terminals and an equipment or between two equipments and/or to a packet transmission time relating to a segment between one of the terminals and an equipment or between two equipments.

It will be noted that the reiteration of the steps proves to be particularly advantageous if the analysis is effected on packets selected from the test stream, for example by sampling the test stream. In fact, in this case certain instantaneous vectors may provide incomplete information. On the other hand, if the analysis is effected on all the packets of the test stream, the data listed above can be obtained by correlation without reiteration.

Figure 2:
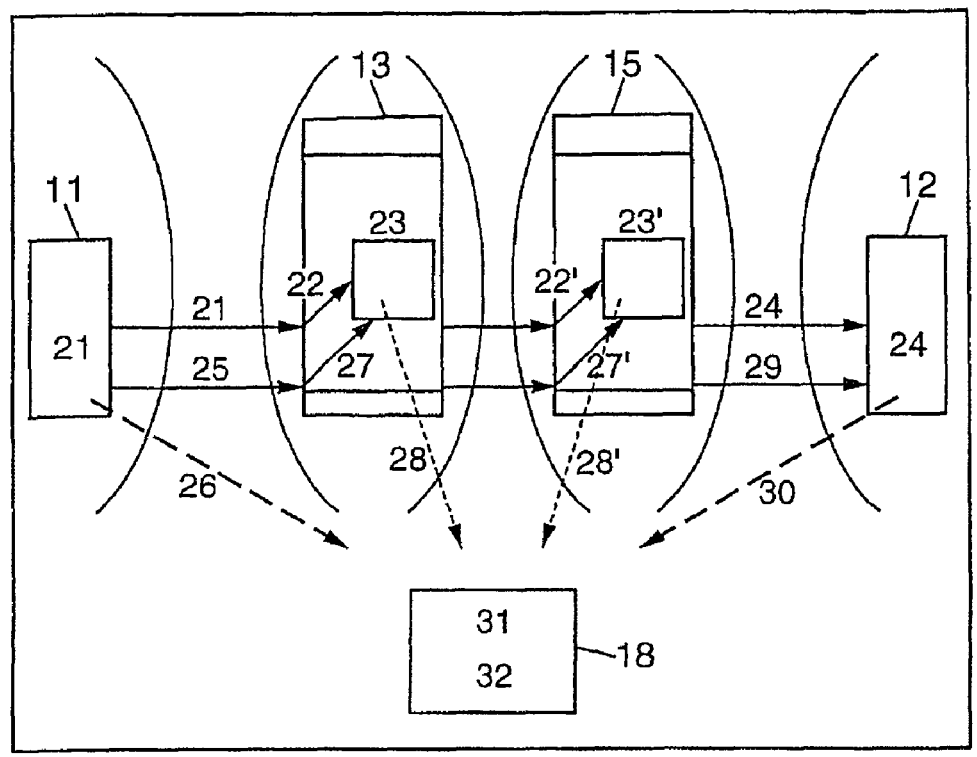
FIG. 2 shows a network measurement method as claimed in one embodiment of the invention.

FIG. 2 shows a network measurement method as claimed in one embodiment of the invention.

A stream of test packets sent by the terminal 11 to the terminal 12 passes through the equipments 13 and 15, each of which is provided with a stream measurement unit having an IPFIX type stream information export function.

In one embodiment of the invention, the measurement units sample, manage and store stream descriptions in a table of stream characteristics. The structure of the entries in this table is analogous to the structure described above with reference to table 2. As claimed in the type of service of the analyzed stream, the functional level of the analysis or the network equipment type, this table may have additional fields or, conversely, some of the fields already list may not be filled in.

A network generally comprises an integer number N of equipments. The stream descriptions are sent to the collection unit 18 from one of the IP addresses of the equipment Ei, denoted Ei_SrcAddrMgt.

The packets of the IP stream sent by the terminal 11 to the terminal 12 are therefore observed when they enter the equipments Ei.

In an embodiment of the invention, the measurement method therefore comprises the following steps:

- step 21: sending of the first packet corresponding to a TCP connection request from the terminal 11 to the terminal 12;
- step 22, 22': presentation of the first packet to the stream analysis process of the measurement units of the equipments Ei;
- step 23, 23': creation of a new entry in the table of stream characteristics managed by the stream measurement units of the equipments Ei; in this step, a time reference of passage of the first packet analyzed is stored in the 'First' field;
- step 24: reception of the first connection request packet by the terminal 12 and sending of a SYN-ACK acknowledgement message by the terminal 12 to the terminal 11;
- step 25: reception of the SYN-ACK acknowledgement message by the terminal 11 and sending of a TCP connection closure RST message to the terminal 12;
- step 26: sending of the packet stream description by the terminal 11 to the collection unit 18;
- step 27, 27': detection of end of stream on reception of the RST packet and storage of a time reference of passage of this last packet in the 'Last' field by the measurement units;
- step 28, 28': exporting of the stream descriptions by the measurement units of the equipments Ei to the collection unit 18;
- step 29: reception of the last connection closure packet by the terminal 12;
- step 30: sending of the packet stream description by the terminal 12 to the collection unit 18;
- step 31: grouping and correlation of the data relating to this stream by the collection unit 18;
- step 32: production of the vectors of information relating to equipments of the path of the stream or to segments of the path taken by the packets of that stream or even relating to the complete path by the collection unit.

Each of the steps of the measurement method cited above is described in detail hereinafter.

In the step 21, the terminal 11 requests the opening of a TCP connection with the terminal 12. It sends a TCP message, the SYN field of which has the value 1, to the terminal 12. The terminal 11 memorizes a time reference, denoted T11_SYN_time, relating to the instant of transmission of the packet. The characteristics of the test stream are:

T11_SrcAddr;
T11_SrcPort;
T12_DstAddr;
T12_DstPort;
TCP protocol.

In the step 22, 22', the packet sent during the preceding step is presented to the analysis process of each network equipment through which it passes, if it is selected.

In the step 23, 23', the analysis process to which the first packet is presented detects the start of a new TCP connection, by checking the value of the 'SYN' field of the TCP header of the packet. It therefore creates an entry in the table of stream characteristics for this connection. Then, in an embodiment of the invention, the process assigns a value to the different fields of the entry in the table. Thus, it assigns a time reference of the instant of arrival of the packet to the 'First' field of the table entry. Then, it assigns the number of octets in the IP packet to the 'Octets' field of the table entry. It assigns the value 1 to the 'Packets' field of the table entry. It assigns the value corresponding to the SYN flag to the 'TcpFlags' field of the table entry. It assigns the value of T11__SrcAddr to the 'SrcAddr' field of the table entry. It assigns the value of T11_SrcPort to the 'SrcPort' field of the table entry. It assigns the value of T12_DstAddr to the 'DstAddr' field of the table entry. It assigns the value of T12_DstPort to the 'DstPort' field of the table entry. It assigns a value corresponding to the TCP protocol to the 'Proto' field of the table entry.

In the step 24, the terminal 12 receives a TCP connection opening request. It stores a time reference of the arrival of the packet in the 'T12_SYN_time' field. Then responds by sending a packet comprising a TCP connection acceptance message. Such a message is a packet in which the header has the 'SYN' field equal to 1 and the 'ACK' field equal to 1.

In the step 25, the terminal 11 receives the TCP connection opening acceptance message. It responds to this message by sending a packet comprising a connection closure by reset message. It stores a time reference of the transmission of this packet in the 'T11_RST_time' field.

In the step 26, the terminal 11 produces a packet stream description of this stream and sends it to the collection unit 18. This description preferably contains the following information:

T11_SrcAddr;
T11_SrcPort;
T12_DstAddr;
T12_DstPort;
protocol;
T11_SYN_time;
T11_RST_time;
Tcp_flags;
T11_AS;
T11_Tos.

In the case where the terminal 11 exports the descriptions in an IPFIX type format, the description sent to the collection unit is detailed in the table below.

TABLE 3

| IPFIX field | Measurement field |
|---|---|
| SrcAddr | T11_SrcAddr |
| DstAddr | T12_DstAddr |
| NextHop | E1_AddrN |
| Input | 0 |
| Output | 0 |
| Packets | 2 |
| Octets | 2*24 |
| First | T11_SYN_time |
| Last | T11_RST_time |
| SrcPort | T11_SrcPort |
| DstPort | T12_DstPort |
| pad1 | Not used (zero) |
| TcpFlags | SYN\|RST |
| Proto | TCP |
| Tos | T11_Tos |
| SrcAS | T11_SrcAS |
| DstAS | T11_DstAS |
| SrcMask | Mask of T11_SrcAddr |
| DstMask | Unknown |
| Pad2 | Not used |

In the step 27, 27', the analysis process to which the last packet is presented detects the end of a TCP connection, by checking the value of the 'RST' field of the TCP header of the packet. If no entry exists for this stream, the analysis process creates a new entry in the table of stream characteristics. Otherwise, an entry already exists for this stream and the process increments the value of the 'Octet' field of the table entry by the number of octets in the packet. It increments by the value 1 the 'Packets' field of the table entry. Then, whether the entry is new or not, it assigns a time reference of the time of arrival of the packet to the 'Last' field of the table entry.

Finally, a stream description is generated and sent to the collection unit. The corresponding table entry is then preferably released. The table below details an entry in the table of stream characteristics of the network equipment Ei for a given test steam. The source AS is denoted A and the destination AS is denoted B.

TABLE 4

| IPFIX field | Measurement field |
|---|---|
| SrcAddr | T11_SrcAddr |
| DstAddr | T12_DstAddr |
| NextHop | Ei+1_AddrN |
| Input | i |
| Output | j |
| Packets | 2 |
| Octets | 48 |
| First | Ei_SYN_time |
| Last | Ei_RST_time |
| SrcPort | T11_SrcPort |
| DstPort | T12_DstPort |
| Pad1 | Not used |
| TcpFlags | SYN\|RST |
| Proto | TCP |
| Tos | Ei_Tos |
| SrcAS | A |
| DstAS | B |
| SrcMask | Mask of T11_SrcAddr |
| DstMask | 0 |
| Pad2 | Not used |

In the step 28, the measurement units prepare a stream description. These stream descriptions can also be grouped into stream description blocks before being sent to the collection unit. The stream descriptions are sent to the collection unit from the address Ei_SrcAddrMgmt. The destination address of this packet is Ei_DstAddrMgmt. The present invention also covers the configuration in which the measurement units store the stream descriptions and the collection unit downloads them when it wants to.

In the step 29, the terminal 12 receives an end-of-connection message packet from the terminal 11. On reception of this packet, it stores a reception time reference in T12_RST_time.

In the step (30), the terminal 12 sends to the collection unit the test packet stream description. This description contains the following information:

T11_SrcAddr;
T11_SrcPort;
T12_DstAddr;
T12_DstPort;
protocol;
T12_SYN_time;
T12_RST_time;
Tcp_flags;
T12_AS;
T12_Tos.

In the step 31, the collection unit 18 groups the stream descriptions received from the measurement units and the packet stream descriptions received from the terminals. The table below details the duly grouped information.

TABLE 5

| IPFIX field | T11 | ... Ei | Ei+1 | ... T12 |
|---|---|---|---|---|
| SrcAddr | T11_SrcAddr | ... T11_SrcAddr | T11_SrcAddr | ... T11_SrcAddr |
| DstAddr | T12_DstAddr | ... T12_DstAddr | T12_DstAddr | ... T12_DstAddr |
| NextHop | E1_AddrN | ... Ei+1_AddrN | Ei+2_AddrN | ... 0 |
| Input | 0 | ... I | I | ... T12_in |
| Output | T11_out | ... J | J | ... 0 |
| Packets | 2 | ... 2 | 2 | ... 2 |
| Octets | 48 | ... 48 | 48 | ... 48 |
| First | T11_SYN_time | ... Ei_SYN_time | Ei+1_SYN_time | ... T12_SYN_time |
| Last | T11_RST_time | ... Ei_RST_time | Ei+1_RST_time | ... T12_RST_time |
| SrcPort | T11_SrcPort | ... T11_SrcPort | T11_SrcPort | ... T11_SrcPort |
| DstPort | T12_DstPort | ... T12_DstPort | T12_DstPort | ... T12_DstPort |
| TcpFlags | SYN RST | ... SYN RST | SYN RST | ... SYN RST |
| Proto | TCP | ... TCP | TCP | ... TCP |
| Tos | T11_Tos | ... Ei_Tos | Ei+1_Tos | ... T12_Tos |
| SrcAS | T11_AS | ... Ei_AS or Src_AS | Ei_AS or Src_AS | ... ? |
| DstAS | ? | ... Ei+1_AS or Dst_AS | Ei+2_AS or Dst_AS | ... T12_AS |
| SrcAddrMgmt | T11_AddrMgmt | ... Ei_AddrMgmt | Ei+1_AddrMgmt | ... T12_AddrMgmt |

In the step 32, in one embodiment of the invention, according to the configuration of the collection unit, the latter can supply:

- information relating to the path of the packets of the stream in the network;
- information relating to the management of the equipments on the path of the stream in the network;
- information relating to the processing of the stream in the equipments on the path;
- network performance information relating to a loss of packets on a segment between one of the terminals and an equipment or between two equipments and/or a packet transmission lead time on a segment between one of the terminals and an equipment or between two equipments and/or a packet transmission lead time variation.

It can also calculate packet transmission lead times and packet losses on the complete path of the stream, as shown in the examples described in the sections below.

In one embodiment of the invention, the collection unit supplies NextHop vectors from "end-to-end" by grouping the NextHop information from the SYN and RST packets, from the step (31).

TABLE 6

|  | T11 | . Ei_AddrN | Ei+1_AddrN | . T12 |
|---|---|---|---|---|
| SYN | T11_AddrN | . Ei_AddrN | Ei+1_AddrN | . 0 |
| RST | T11_AddrN | . Ei_AddrN | Ei+1_AddrN | . 0 |

In one embodiment of the invention, the collection unit supplies management interface vectors, by grouping the management interface information from the SYN and RST packets of the test stream, from the step 31.

TABLE 7

|  | T11 | . Ei_AddrN | Ei+1_AddrN | . T12 |
|---|---|---|---|---|
| SYN | T11_AddrMgmt | . Ei_AddrMgmt | Ei+1_AddrMgmt | . T12_AddrMgmt |
| RST | T11_AddrMgmt | . Ei_AddrMgmt | Ei+1_AddrMgmt | . T12_AddrMgmt |

The corresponding final vector is therefore {T11_AddrMgmt, ..., Ei_AddrMgmt, Ei+1_AddrMgmt, ..., T12_AddrMgmt}.

In one embodiment of the invention, the collection unit supplies AS vectors, by grouping the AS information from the SYN and RST packets analyzed and identified by the collection unit, from the step 31. The AS of the source of the stream and the AS of the destination of the stream are respectively described in the fields exported by the terminals, Src_AS and Dst_AS. A measurement unit exports, for a given equipment Ei, the preceding AS in the path and the next AS in the path, that is the AS of the NextHop of the stream.

The case described below proves very useful in an IP network for a stream path passing through several different ASs. Knowing the list of ASs passed through by a stream makes it possible to create an inter-domain diagnostic. The table below groups the information of the ASs from the SYN and RST packets to produce the AS vectors relating to segments of the path of the stream.

TABLE 8

|  | T11 | . Ei | Ei+1 | . T12 |
|---|---|---|---|---|
| SYN Src_AS | T11_AS | . Ei−1_AS | Ei_AS | . ? |
| SYN Dst_AS | ? | . Ei+1_AS | Ei+2_AS | . T12_AS |
| RST Src_AS | T11_AS | . Ei−1_AS | Ei_AS | . ? |
| RST Dst_AS | ? | . Ei+1_AS | Ei+2_AS | . T12_AS |

The corresponding final vector is therefore {T11_AS, ..., Ei−1_AS, Ei_AS, Ei+1_AS, Ei+2_AS, ..., T12_AS).

In an embodiment of the invention, the collection unit supplies Tos (or even QoS) vectors by grouping the information from the SYN and RST packets, as detailed in the table below. The Tos field is one of the rare fields that a network equipment is allowed to modify. This field determines the quality level of the processing of the packet in the queues of the network equipments. It is important information, particularly between domains, for putting in place devices for marking the quality of the services.

TABLE 9

| NextHop | T11 | . | Ei | Ei+1 | . | T12 |
|---------|-----|---|-----|------|---|-----|
| SYN | T11_tos | . | Ei_Tos | Ei+1_Tos | . | T12_Tos |
| RST | T11_tos | . | Ei_Tos | Ei+1_Tos | . | T12_Tos |

The final vector is therefore {T11_Tos, . . . , Ei_Tos, Ei+1_Tos, . . . , T12_ToS}.

The collection unit can also calculate a transmission lead time vector of a packet from "end-to-end" according to one of the following equations:

T12_SYN_time−T11_SYN_time;

T12_RST_time−T11_RST_time.

The loss and time vectors are complementary. A packet observed by T12 can be used to calculate a transmission lead time as illustrated in the table below.

TABLE 10

| Time T11->Ei | ... Time Ei->Ei+1 | ... Time Ei+1->T12 |
|--------------|-------------------|---------------------|
| Ei_SYN_time-T11_SYN_time | ... Ei+1_SYN_time-Ei_SYN_time | ... T12_SYN_time-Ei+1_SYN_time- |
| Ei_RST_time-T11_RST_time | ... Ei+1_RST_time-Ei_RST_time | ... T12_RST_time-Ei+1_RST_time- |

On the other hand, an unobserved packet can be used to calculate a loss. A loss of a SYN packet between the equipment Ei+1 and the terminal 12 is detected as shown by the table below.

TABLE 11

|  | T11 | . | Ei | Ei+1 | . | T12 |
|--|-----|---|----|------|---|-----|
| Packets | 1 | . | 1 | 1 | . | 0 |

In the case illustrated above, the terminal 11 sends a TCP connection opening message to the terminal 12. The corresponding packet is observed by the network equipments Ei, Ei+1 . . . This message is not visibly received by the terminal 12. Because of this, the terminal 11 does not receive a corresponding acknowledgement message. Thus, the SYN message is retransmitted by the terminal 11. On receiving this second SYN message, the network equipments assume that a new connection, therefore a new stream, is to be processed. A new entry in the table of stream characteristics is then created.

In the case illustrated by the table below, a loss of an RST packet between the network equipments Ei and Ei+1 is detected. This loss is confirmed by the fact that the RST packet is not received by T12.

TABLE 12

|  | T11 | . | Ei | Ei+1 | . | T12 |
|--|-----|---|----|------|---|-----|
| Packets | 2 | . | 2 | 1 | . | 1 |

Thus, the segment Ei–Ei+1 of the complete path that has lost the packet is identified.

It will be noted that, when a stream is analyzed by sampling, the instantaneous vectors supplied by the collection unit are less accurate and fewer in number. In practice, in such conditions, a test packet is not systematically analyzed by all the routers. However, for each test stream, "end-to-end" measurements are still available.

Moreover, the TCP type connections pass through the "firewalls" of the IP networks. Thus, the present invention based on a TCP type protocol makes it possible to obtain measurements on paths passing through firewalls.

In certain cases, it is advantageous to introduce a collection unit comprising two modules into the architecture of the network described above. For example, if a module of a collection unit is adapted to receive and manage stream descriptions sent by the measurement units but not to receive packet stream descriptions from the terminals, another module is added to receive the packet stream descriptions.

Figure 3:
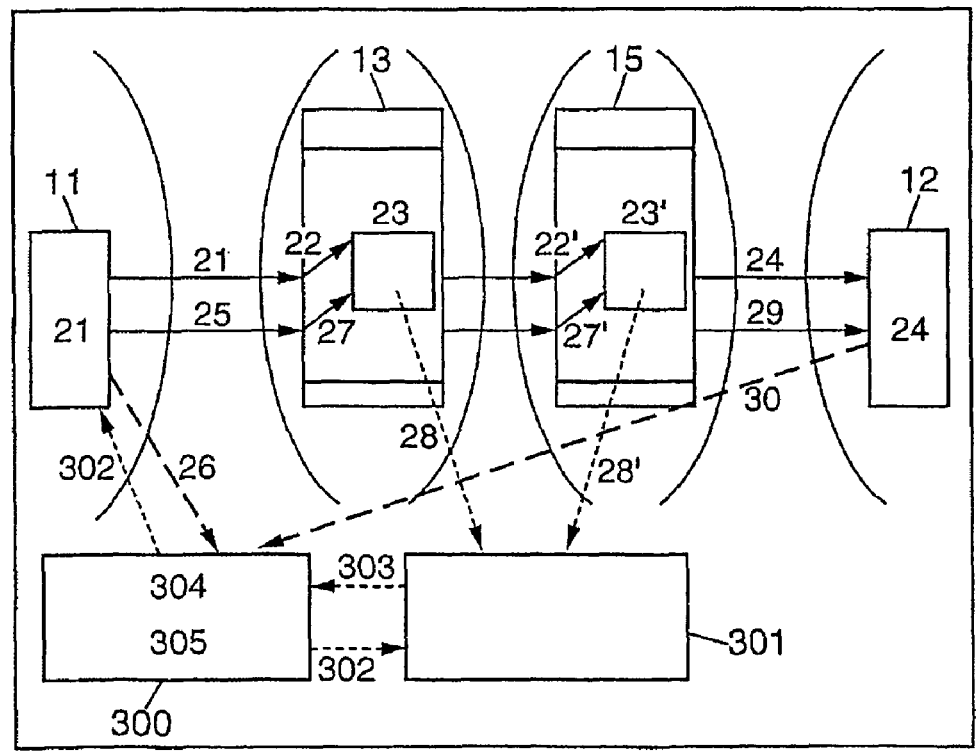
FIG. 3 shows a method as claimed in one embodiment of the invention in a network architecture based on a collection unit comprising first and second modules.

FIG. 3 shows a method as claimed in one embodiment of the invention in a network architecture based on a collection unit comprising a first and a second module. The method therefore comprises the following steps:

step 302: sending to the terminal 11 and to the second module 301 a message requesting copying by the first module 300 of the test stream descriptions between the terminals 11 and 12, corresponding to a measurement start;

step 21: sending of the first packet corresponding to a TCP connection request from the terminal 11 to the terminal 12;

step 22, 22': presentation of the first packet to the stream analysis process of the measurement units of the equipments Ei;

step 23, 23': creation of a new entry in the table of stream characteristics managed by the stream measurement units of the equipments Ei; in this step, a time reference of passage of the first packet analyzed is stored in the 'First' field;

step 24: reception of the first connection request packet by the terminal 12 and sending of a SYN-ACK acknowledgement message by the terminal 12 to the terminal 11;

step 25: reception of the SYN-ACK acknowledgement message by the terminal 11 and sending of a TCP connection closure RST message to the terminal 12;

step 26: sending of the packet stream description by the terminal 11 to the first module 300;

step 27, 27': detection of the end of the stream on reception of the RST packet and storage of a time reference of passage of this last packet in the 'Last' field by the measurement units;

step 28, 28': exporting of the stream descriptions by the measurement units of the equipments Ei to the second module 301;

step 29: reception of the connection closure packet by the terminal 12;

step 30: sending of the stream description by the terminal 12 to the first module 300;

step 303: transmission on the fly of the stream descriptions between the terminals 11 and 12 by the second module 301 to the first module 300;

step 304: grouping and correlation of the data relating to the stream by the first module 300;

step 305: production by the first module 300 of the vectors of the information relating to equipments of the path of the stream or to segments of the path taken by the packets of this stream or relating to the complete path.

In a configuration in which the collection unit comprises two modules 300 and 301, the module 300 of the collection unit preferably uses input filtering to filter only the information relating to the streams studied.

In one embodiment of the invention, a stream description ticket further comprises a Time To Live field 'TTL'. Such information is conventionally contained in a field of a stream packet. By exporting this information, the collection unit is therefore able very easily to put the equipments Ei on the path of the stream into order.

The present invention proves to be highly advantageous in all fields of packet transmission network metrology, in particular for dimensioning networks, for commissioning and maintaining networks, and for monitoring the quality of service provided. In fact, in the event of detection of "end-to-end" transmission problems, one embodiment of the invention can very quickly locate the segment or segments of the complete path causing the problems, on the basis of relative very accurate and reliable measurements. Furthermore, the measurements provided are made available and usable very quickly. Moreover, one embodiment of the invention is very simple to implement in existing networks.

It will further be noted that it is easy to deduce from the present description an embodiment of the present invention in which a terminal sends the packet stream to more than one terminal. Accordingly, the measurement method as claimed in one embodiment of the invention may easily be applied to 'multicast' transmission to multiple destinations.

In a situation of this kind, it is possible for some or all of the terminals receiving the packet stream sent to send a received packet stream description to the collection unit.

If the collection unit receives a plurality of received packet stream descriptions it can, for example, deduce therefrom the number of receiver terminals that have actually received the 'multicast' stream.

In another embodiment of the present invention, the function of the collection unit as previously stated may advantageously be provided by a plurality of entities in a hierarchical architecture. In an architecture of this kind, a collection unit comprises a plurality of collection entities and a central entity.

The terminal and the measurement unit are then connected to at least one of the collection entities.

For example, a terminal may send packet stream descriptions to one of the collection entities and the one measurement unit can send stream descriptions to another collection entity. Each of those collection entities can then forward the descriptions received to the central entity, which identifies each analyzed packet of the stream as a function of the stream description in order to correlate, packet by packet, the stream description and the packet stream description received in this way.

The invention claimed is:

1. A measurement method for use in a data packet transmission network, wherein a stream of packets of data sent by a first terminal passes in transit through at least one network equipment with which there is associated a stream measurement unit, wherein said first terminal and said measurement unit are connected to a collection unit, said method comprising the following steps:

the first terminal generating a stream of packets, comprising first and second session status control packets;

the measurement unit analyzing only said first and/or second session status control packets of said stream, said first session status control packet being a connection initiation packet and said second session status control packet being a connection closure packet, passing in transit through the network equipment;

the first terminal sending the collection unit a sent packet stream description comprising at least the number of packets sent;

the stream measurement unit sending the collection unit a stream description comprising at least one information item indicating the number of analyzed packets; and the collection unit identifying each analyzed packet of the stream as a function of the stream description to correlate said stream description and said sent packet stream description packet by packet.

2. The method as claimed in claim 1, wherein at least one second terminal connected to the collection unit receives the stream of packets and sends a received packet stream description comprising the number of packets received to the collection unit; and wherein the collection unit identifies each analyzed packet in order to correlate the stream description and the packet stream descriptions packet by packet.

3. The method as claimed in claim 2, wherein the collection unit determines a loss of packets relating to a segment between the equipment and the second terminal by correlation of the number of analyzed packets and of the number of received packets.

4. The method as claimed in claim 2, wherein the packet stream descriptions further comprise a time reference of the sending by the first terminal and/or of the reception by the second terminal for each packet of the stream and the stream descriptions further comprise a time reference for the passage through the equipment of the first and last analyzed packets, and wherein the collection unit determines a transmission lead time of said first and last analyzed packets relating to a segment between a terminal and the equipment by correlation of said time references of the packets.

5. The method as claimed in claim 1, wherein the collection unit determines a loss of packets relating to a segment between the first terminal and the equipment by correlation of the number of sent packets and of the number of analyzed packets.

6. The method as claimed in claim 1, wherein a plurality of network equipment is provided with respective measurement units and wherein the collection unit supplies at least one of the following kinds of information instantaneously:

information relating to the path of the packets of the stream in the network;

information relating to management of the equipments of the path of the stream in the network;

information relating to processing of the stream in the equipments of the path;

performance information relating to a loss of packets on a segment between a terminal and an equipment or between two equipments;

performance information relating to a packet transmission lead time on a segment between a terminal and an equipment or between two equipments; and performance information relating to a packet transmission lead time variation on a segment between a terminal and an equipment or between two equipments.

7. The method as claimed in claim 1, wherein the measurement unit supplies by iteration of the steps of the method as claimed in claim 1 at least one statistic of the following measurements relating to a segment between a terminal and an equipment or between two equipments:
- a loss of packets;
- a packet transmission lead time; and
- a transmission lead time variation.

8. The method as claimed in claim 1, wherein the measurement unit analyzes a subset of packets of the stream selected from the packets of the stream received by the equipment.

9. A collection unit comprising:
- means for collecting at least one stream description of packets comprising at least the number of packets sent;
- means for collecting at least one stream description received from a measurement unit which analyzes only a first and/or a second session status control packet of the stream, said first session status control packet being a connection initiation packet and said second session status control packet being a connection closure packet, said stream description comprising at least one information item indicating the number of analyzed packets; and
- correlation means adapted to identify each analyzed packets of the stream as a function of the stream description, and to correlate stream descriptions and packet stream descriptions packet by packet.

10. A measurement system for use in a data packet transmission telecommunication network comprising:
at least one terminal comprising:
- means of generating a stream of packets comprising first and second session status control packets said first session status control packet being a connection initiation packet and said second session status control packet being a connection closure packet;
- means of sending a sent packet stream description, comprising at least the number of packets sent;

a collection unit comprising:
- means for collecting at least one stream description of packets comprising at least the number of packets sent;
- means for collecting at least one stream description received from a measurement unit which analyzes only a first and/or a second session status control packet of the stream, said stream description comprising at least one information item indicating the number of analyzed packets;
- correlation means adapted to identify each analyzed packets of the stream as a function of the stream description, and to correlate stream descriptions and packet stream descriptions packet by packet; and at least one measurement unit associated with an equipment of the network comprising means for analyzing a first and/or a second session status control packet of the stream; and means for sending to a collection unit a stream description comprising at least one information item indicating the number of analyzed packets.

\* \* \* \* \*